US012802265B2

(12) United States Patent
Yuan et al.

(10) Patent No.: US 12,802,265 B2
(45) Date of Patent: Nov. 17, 2026

(54) METHOD AND SYSTEM FOR DETERMINING A CAMERA POSITION

(71) Applicant: Axis AB, Lund (SE)

(72) Inventors: Song Yuan, Lund (SE); Jiandan Chen, Lund (SE)

(73) Assignee: AXIS AB, Lund (SE)

( * ) Notice: Subject to any disclaimer, the term of this patent is extended or adjusted under 35 U.S.C. 154(b) by 211 days.

(21) Appl. No.: 18/984,314

(22) Filed: Dec. 17, 2024

(65) Prior Publication Data

US 2025/0200793 A1 Jun. 19, 2025

(30) Foreign Application Priority Data

Dec. 19, 2023 (EP) .................................... 23218061

(51) Int. Cl.
*G06K 9/00* (2022.01)
*G06T 7/00* (2017.01)
(Continued)

(52) U.S. Cl.
CPC .................. *G06T 7/73* (2017.01); *G06T 7/70* (2017.01); *G06T 7/97* (2017.01); *G06V 20/44* (2022.01);
(Continued)

(58) Field of Classification Search
CPC ..... G06T 7/10; G06T 7/11; G06T 7/20; G06T 7/70; G06T 7/73; G06T 7/80; G06T 7/97; G06T 2207/10004; G06T 2207/10016; G06T 2207/30232; G06T 2207/30236; G06T 2207/30242; G06T 2207/30244; G06T 2207/30252; G06V 10/242; G06V 10/26; G06V 10/40; G06V 10/56; G06V 10/62; G06V 10/70; G06V 20/176; G06V 20/182; G06V 20/40; G06V 20/44; G06V 20/52; G06V 20/54; G06V 20/56;
(Continued)

(56) References Cited

U.S. PATENT DOCUMENTS 8,121,350 B2 * 2/2012 Klefenz ............... G06V 20/588 382/104
9,476,970 B1 * 10/2016 Fairfield .................. G06T 7/74
(Continued)

FOREIGN PATENT DOCUMENTS

WO 2013059850 A1 5/2013

*Primary Examiner* — Eric Rush
(74) *Attorney, Agent, or Firm* — Volpe Koenig

(57) ABSTRACT

Using a sequence of images depicting a traffic situation involving a plurality of moving vehicles recorded by a camera, a set of image event data are determined, where each image event data indicates a respective number of events related to the moving vehicles occurring during a respective imaging time interval. A set of incident event data are obtained from a database, where each incident event indicates a respective number of events occurring during a respective incident time interval, detected by a traffic event detector located at a known detector geographical position. It is determined, based on a matching procedure between the set of image event data and the set of incident event data, that the events associated with the set of image event data are the events associated with the set of incident event data, and thus the camera geographical position is associated with the detector geographical position.

13 Claims, 3 Drawing Sheets

(51) Int. Cl.

| | |
|---|---|
| ***G06T 7/70*** | (2017.01) |
| ***G06T 7/73*** | (2017.01) |
| ***G06V 20/40*** | (2022.01) |
| ***G06V 20/54*** | (2022.01) |
| ***G06V 20/58*** | (2022.01) |
| ***G06V 20/90*** | (2022.01) |
| ***G08G 1/01*** | (2006.01) |
| ***G08G 1/015*** | (2006.01) |
| ***G08G 1/017*** | (2006.01) |
| ***G08G 1/04*** | (2006.01) |
| ***G08G 1/065*** | (2006.01) |
| ***G08G 1/123*** | (2006.01) |
| *G06T 7/11* | (2017.01) |

(52) U.S. Cl.

CPC .............. *G06V 20/54* (2022.01); *G06V 20/58* (2022.01); *G06V 20/90* (2022.01); *G08G 1/01* (2013.01); *G08G 1/0116* (2013.01); *G08G 1/0129* (2013.01); *G08G 1/0137* (2013.01); *G08G 1/015* (2013.01); *G08G 1/017* (2013.01); *G08G 1/04* (2013.01); *G08G 1/065* (2013.01); *G08G 1/123* (2013.01); *G06T 7/11* (2017.01); *G06T 2207/10016* (2013.01); *G06T 2207/30236* (2013.01); *G06T 2207/30242* (2013.01); *G06T 2207/30244* (2013.01); *G06T 2207/30252* (2013.01)

(58) Field of Classification Search

CPC ...... G06V 20/58; G06V 20/588; G06V 20/90; G08G 1/01; G08G 1/0104; G08G 1/0116; G08G 1/012; G08G 1/0125; G08G 1/0129; G08G 1/0133; G08G 1/0137; G08G 1/0141; G08G 1/015; G08G 1/017; G08G 1/04; G08G 1/052; G08G 1/056; G08G 1/065; G08G 1/123; G08G 1/20

USPC ....... 382/100, 103, 104, 106, 173, 181, 190, 382/195, 199, 224–227, 229, 291, 293, 382/296, 305, 312, 325; 340/905, 907, 340/909, 933–937, 988, 989; 348/61, 348/113, 116, 118, 135, 143, 148, 149; 701/1, 400, 408, 422, 423, 458, 516, 701/519–521, 523

See application file for complete search history.

(56) References Cited

U.S. PATENT DOCUMENTS

| | | | | |
|---|---|---|---|---|
| 12,092,470 | B2 * | 9/2024 | Wang ..................... | G06V 20/58 |
| 12,469,308 | B2 * | 11/2025 | Franc ..................... | G06V 20/56 |
| 2014/0118536 | A1 | 5/2014 | Morin et al. | |
| 2014/0313347 | A1 | 10/2014 | Wu et al. | |
| 2019/0057600 | A1 | 2/2019 | Watanabe et al. | |
| 2019/0180422 | A1 | 6/2019 | Chu et al. | |
| 2021/0364320 | A1 * | 11/2021 | Mennen ............... | G06V 20/588 |

* cited by examiner

METHOD AND SYSTEM FOR DETERMINING A CAMERA POSITION

TECHNICAL FIELD

The present invention relates to geographical positioning of a camera recording a sequence of images depicting a traffic situation involving a plurality of moving vehicles.

BACKGROUND

Surveillance cameras are often installed in fixed locations and used for observation of a certain scenery, often as a part of a network of multiple cameras. If exact information about the location and orientation of a camera is not provided in connection with installation, or if such information is lost or if the camera has been moved, it may be challenging to figure out where the camera is located, especially what precise scenery it is observing.

While external signal sources like global navigation satellite system (GNSS) signals may be used for localisation, these are not always available or reliable, and will not provide any details about the scenery observed by the camera. If the camera is, for example, observing a stretch of road or road crossing in an area dense with crossings such as a city, it would be beneficial if it could be determined which exact stretch of road or road crossing it is observing. It would also be beneficial to know from what angle the camera is observing the scenery. Thus, having a system of determining what scenery is being observed by a camera, without the need of visiting the site of the camera, is highly sought after.

US patent application publication 2019/0057600 describes an investigation assist system wherein vehicles at road intersections are monitored.

SUMMARY OF THE INVENTION

With the above in mind, an object of the present invention is to provide a system, which seeks to mitigate, alleviate or eliminate one or more of the above-identified deficiencies in the art and disadvantages singly or in any combination.

Hence, in a first aspect of the present invention there is provided a method of determining a camera geographical position of a camera. The method comprises obtaining a sequence of images recorded by the camera. The sequence of images depicts a traffic situation that involves a plurality of moving vehicles. Based on the sequence of images, a plurality of events related to the moving vehicles are determined. Based on the plurality of events, a set of image event data are determined. The set of image event data may contain one or more image event data. Each image event data indicates a respective number of events that occur during a respective imaging time interval, $T_{IMG}$. A set of incident event data are obtained from a database. The set of incident event data may contain one or more incident event data. Each incident event data indicates a respective number of events that occur during a respective incident time interval, $T_{TE}$. The events of the incident event data are events detected by a traffic event detector located at a detector geographical position.

In other words, the traffic situation may be any scenery including a road where vehicles travel, such as a crossing, a roundabout, a road segment, or the like. Vehicles may include, but not limited to, a car, a bus, a truck, a motorbike, a bike, or the like. A traffic event may be taken to mean an event where a vehicle enters or leaves the traffic situation, or makes a change of direction. The incident event data has been collected by the traffic event detector. The traffic event detector has a well-known geographical location. The traffic detector may be any object or entity gathering information on traffic events at a known geographical location, such as a human, a camera, detectors built into traffic lights, detectors built into the road, or the like, and storing it in a database. The database may for example be a public repository of traffic data handled by a traffic authority, a commercially available database, or the like.

A matching procedure is performed on the set of image event data and the set of incident event data. The matching procedure results in a matching parameter. The matching parameter represents a measure of how well the image event data and the incident event data correspond to each other. Based on the matching parameter, it is determined that the events associated with the set of image event data are the events associated with the set of incident event data. Based on the determination that the events associated with the set of image event data are the events associated with the set of incident event data, it is determined that the camera geographical position is associated with the detector geographical position.

The image event data collected by the camera during $T_{IMG}$ is matched with the incident event data from the database, where $T_{TE}$ is similar to $T_{IMG}$. The matching procedure may be done in several ways, for example the matching parameter may be given in a percentage of how well the set of image event data and the set of incident event data overlap. The set of incident event data that gives the matching parameter with the highest percentage may then be chosen as the match for the set of image event data.

Such a method is advantageous at least in that it enables determination of the camera geographical position based on what the camera observes. The use of such a method means that determining the camera geographical position is independent on external signal sources like global navigation satellite system (GNSS). A major advantage of such a method, compared to other methods of determining position, is that in addition to position it gives you information about what scenery the camera is observing. This may be particularly useful in a network comprising several cameras where the observations of several cameras can be related to each other.

In various embodiments, the method may comprise performing image segmentation of at least one image among the sequence of images recorded by the camera. From at least one segmented image a first road segment may be identified. Using the sequence of images, a cross-line may be defined to span transversely across the first road segment. The cross-line is located at a first road segment position where the first road segment is visible to the camera. It may then be determined, based on the sequence of images, that a moving vehicle crosses the cross-line. Each image event data may then be a respective number of moving vehicles passing the cross-line at the first road segment position.

In other words, the cross-line is a virtual line used as a tool to determine when a vehicle passes a road segment.

Each incident event data may be a respective number of vehicles passing the traffic event detector located at the detector geographical position along the first road segment. A distance offset may be determined between the detector geographical position and the first road segment position. Based on the distance offset, a corresponding time offset may be estimated. The time offset may be applied on the set of image event data or the set of incident event data.

In various embodiments, the distance offset may be a value ranging from 0 to the distance from the traffic event detector to a next closest traffic event detector. The time offset may for example be calculated based on the known speed limit of the first road segment or, if such information is available, based on the average speed of vehicles on the first road segment. The time offset may be added or subtracted from the plurality of events related to the moving vehicles (120), depending on what information is known with regards to the direction of movement of the moving vehicles (120).

In various embodiments, the method may comprise identifying a second road segment from the at least one segmented image. The second road segment may intersect the first road segment at an intersection. In such a situation the first road segment position may be defined to be situated where the first road segment enters the intersection. A second road segment position may be defined to be situated where the second road segment enters the intersection.

In a situation where the traffic event detector, and the first road segment, is located between two intersections, and the camera is located at one of the two intersections, the distance offset can be determined as the distance from the known location of the traffic event detector to the closest intersection.

The matching procedure may comprise transforming the at least one segmented image into a two-dimensional top view of the traffic situation. The top view may be rotated such that the matching procedure is performed for a plurality of rotational positions. Each rotational position yields a resulting matching parameter. The matching parameter is a measure of how well the set of image event data and the set of incident event data correspond to each other.

In other words, by identifying at least two road segments forming an intersection, the matching procedure can be improved such that it is more likely to correctly match image event data with incident event data. Transforming the at least one segmented image into a top view enables the matching procedure to take rotational position into account. The transformation enables the determination of the camera rotation. This may be particularly useful when the method is used for a network of cameras each observing the intersection from a respective point of view. In such a network of cameras, the rotation of the cameras relative each other may be determined and used as a further parameter for the matching procedure.

The determination that the camera geographical position is associated with the detector geographical position may comprise determining the geographical position of the respective road segment positions. The camera geographical position may then be determined based on the geographical position of the respective road segment position.

The determination that the camera geographical position is associated with the detector geographical position may comprise determining the orientation of the camera based on geographical position of the respective road segment position.

In this way, by basing it on the road segment positions, the camera geographical position can be determined more precisely.

In various embodiments, the method may comprise determining, based on the sequence of images, a set of additional image event data. The set of additional image event data may contain a number of additional image event data. Each additional image event data is indicating a respective number of moving vehicles crossing an additional cross-line during the imaging time interval, $T_{IMG}$. The additional cross-line is defined, using the sequence of images, to span transversely across the second road segment and to be located at the second road segment position. A set of additional incident event data may be obtained from the database. The set of additional incident event data may contain a number additional incident event data. Each additional incident event data is indicating a respective number of moving vehicles passing an additional vehicle detector during the traffic event time interval, $T_{TE}$. The additional vehicle detector is located at an additional detector geographical position.

The matching procedure may be performed on the set of additional image event data and the set of additional incident event data. The matching procedure may then yield a resulting additional matching parameter. The additional matching parameter represents a measure of how well the set of additional image event data and the set of additional incident event data correspond to each other. Based on the additional matching parameter, it may be determined that the events associated with the set of additional image event data are the events associated with the set of additional incident event. Based on the determination that the events associated with the set of additional image event data are the events associated with the set of additional incident event data, it may be determined that the camera geographical position is associated with the additional detector geographical position.

In other words, image event data and incident event data may be obtained from multiple road segments in an intersection. The additional image event data and the additional incident event data may be used during the matching procedure. In this way, the matching procedure may be further improved such that it is more likely to correctly match image event data with incident event data. By using the additional image event data and additional incident event data, the camera geographical position may be determined more precisely. The imaging time interval, $T_{IMG}$ and the traffic event time interval, TTE may correspond to, or be different than, the imaging time interval, TIMG and the traffic event time interval, TTE as discussed above.

An additional advantage is that the matching procedure may be done in a shorter time since additional image event data makes it more likely that a good match can be identified.

In various embodiments, the method may comprise identifying a respective vehicle attribute associated with the moving vehicles. The determining that a moving vehicle crosses the cross-line may comprise determining that the moving vehicle having an identified vehicle attribute crosses the cross-line. Obtaining, from the database, the set of incident event data may comprise obtaining incident event data associated with vehicles having the identified vehicle attribute. Thus, the matching procedure may comprise matching the vehicle attributes of the image event data and the vehicle attributes of the incident event data.

The identified vehicle attributes may be any one or several of colour of vehicle, type of vehicle such as car, truck, bus, motorbike, bike, speed of vehicle, direction of movement of vehicle.

By identifying vehicle attributes and using them during the matching procedure, the matching procedure may be further improved such that it is more likely to correctly match image event data with incident event data, and may do so in a shorter time.

In a further aspect there is provided a system for determining a camera geographical position of a camera comprising processing circuitry configured to obtain a sequence of images recorded by the camera. The sequence of images depicts a traffic situation that involves a plurality of moving vehicles. Based on the sequence of images, the system is further configured to determine a plurality of events related to the moving vehicles, and determine a set of image event data. The set of image event data may contain a number of image event data. Each image event data indicates a respective number of events that occur during a respective imaging time interval, $T_{IMG}$. Further, the system is configured to obtain a set of incident event data from a database. The set of incident event data may contain a number of incident event data. Each incident event data indicates a respective number of events that occur during a respective incident time interval, $T_{TE}$. The events of the incident event data are events detected by a traffic event detector located at a detector geographical position.

The system is further configured to perform a matching procedure on the set of image event data and the set of incident event data. The matching procedure results in a matching parameter. The matching parameter represents a measure of how well the image event data and the incident event data correspond to each other. The system is further configured to, based on the matching parameter, determine that the events associated with the set of image event data are the events associated with the set of incident event data. The system is further configured to, based on the determination that the events associated with the set of image event data are the events associated with the set of incident event data, determine that the camera geographical position is associated with the detector geographical position.

In a further aspect there is provided a non-transitory computer-readable storage medium having stored thereon instructions to cause the system as summarized above to execute the steps according to the method as summarized above.

These further aspects provide effects and advantages that correspond to those summarized above in connection with the method according to the first aspect.

BRIEF DESCRIPTION OF THE DRAWINGS

The above and other aspects of the present invention will now be described in more detail, with reference to appended figures. The figures should not be considered limiting; instead, they are used for explaining and understanding. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
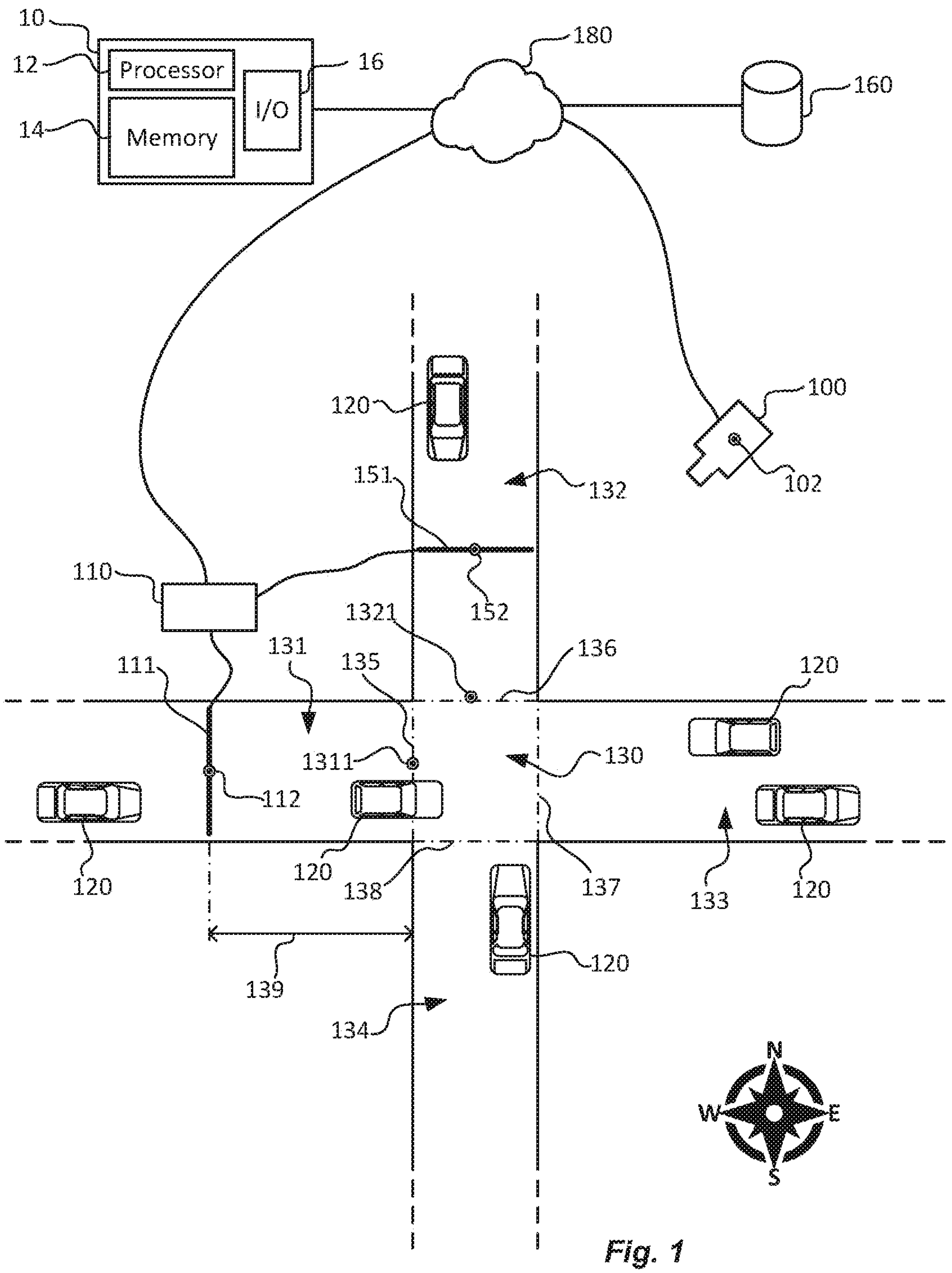
FIG. 1 schematically illustrates a system.

Reference will now be made to FIG. 1, which schematically illustrates a system 10 that comprises processing circuitry configured to determine a camera geographical position 102 of a camera 100. As exemplified in FIG. 1, the system 10 may comprise appropriately configured processing circuitry in the form of a processor 12, memory 14 and an input/output unit 16.

The processor 12 is configured to execute program code stored in the memory 14 in order to carry out functions and operations of the system 10.

The memory 14 may be one or more of a buffer, a flash memory, a hard drive, a removable medium, a volatile memory, a non-volatile memory, a random access memory (RAM), or another suitable device. In a typical arrangement, the memory 14 may include a non-volatile memory for long term data storage and a volatile memory that functions as system memory. The memory 14 may exchange data with the processor 12 over a data bus. Accompanying control lines and an address bus between the memory 14 and the processor 12 may also be present.

Functions and operations of the system 10, including embodiments of a method performed in the context of the system 10 as will be exemplified below, may be embodied in the form of instructions or executable logic routines (e.g., lines of code, software programs, etc.) that are stored on a non-transitory computer readable medium (e.g., the memory 14) of the system 10 and are executed by the processor 12. Furthermore, the functions and operations of the system 10 may be a stand-alone software application or form a part of a software application that carries out additional tasks related to the system 10. The described functions and operations may be considered a method that the corresponding part of the device is configured to carry out.

Also, while the described functions and operations may be implemented in software, such functionality may as well be carried out via dedicated hardware or firmware, or some combination of hardware, firmware and/or software.

The camera 100 may form part of the system 10 or be an external device and be configured to obtain the sequence of images depicting a traffic situation and provide the sequence of images, e.g., via the input/output unit 16 to the processing circuitry.

The system 10 is configured to obtain a sequence of images recorded by the camera 100. The sequence of images depicts a traffic situation that involves a plurality of moving vehicles 120. The traffic situation may be any scenery including a road where vehicles travel, such as a crossing, a roundabout, a road segment, or the like. As exemplified in FIG. 1, the moving vehicles 120 are moving along road segments 131, 132, 133, 134. A vehicle may be, but not limited to, a car, a bus, or a truck.

The system 10 is further configured to determine, based on the sequence of images, a plurality of events related to the moving vehicles 120. The events related to the moving vehicles 120 may for example be a vehicle entering, leaving, or making a change of direction within the traffic situation.

The system 10 is further configured to determine, based on the plurality of events, a set of image event data. The set of image event data may contain one or more image event data. Each image event data indicates a respective number of events that occur during a respective imaging time interval, $T_{IMG}$.

The system 10 is further configured to obtain a set of incident event data from a database 160. The database may for example be a public repository of traffic data handled by a traffic authority. The set of incident event data may contain one or more incident event data. Each incident event data indicates a respective number of events that occur during a respective incident time interval, $T_{TE}$. The events of the incident event data are events detected by a traffic event detector 111 located at a detector geographical position 112.

The traffic detector may be any object or entity gathering information on traffic events at a known geographical location, such as, but not limited to, a person, a camera, detectors built into traffic lights, or detectors built into the road. In some embodiments, each incident event data may be a respective number of vehicles 120 passing the traffic event detector 111.

The system 10 is further configure to perform a matching procedure on the set of image event data and the set of incident event data. The matching procedure matches the set of image event data and the set incident event data where the absolute time period of $T_{TE}$ at least partially overlaps $T_{IMG}$, such that the two sets of data at least partly describe events that occurred during the same time interval.

The matching procedure may result in a matching parameter. The matching parameter represents a measure of how well the image event data and the incident event data correspond to each other. The system 10 is further configured to, based on the matching parameter, determine that the events associated with the set of image event data are the events associated with the set of incident event data. The system 10 is further configured to, based on the determination 212 that the events associated with the set of image event data are the events associated with the set of incident event data, determine 214 that the camera geographical position 102 is associated with the detector geographical position 112.

FIG. 1 further illustrates a non-transitory computer-readable storage medium 15 having stored thereon instructions to cause the system 10 to execute steps of a method illustrated in FIG. 2.

In some embodiments, the system 10 may be configured to perform image segmentation of at least one image among the sequence of images recorded by the camera 100. From at least one segmented image, a first road segment 131 may be identified. Using the sequence of images, a cross-line 135 may be defined to span transversely across the first road segment 131. The cross-line is located at a first road segment position 1311, at a location where the road segment is visible to the camera 100. The system 10 may be configured to determine, based on the sequence of images, that a moving vehicle 120 crosses the cross-line 135. Each image event data may be a respective number of moving vehicles 120 passing the cross-line at the first road segment position 1311.

In some embodiments, the system 10 is configured to determine a distance offset 139 between the detector geographical position 112 and the first road segment position 1311. Based on the distance offset 139, a corresponding time offset may be estimated. The time offset may be applied on the set of image event data or the set of incident event data.

In some embodiments, the system 10 may be configured to identify a second road segment 132 from the at least one segmented image. The second road segment 132 may intersect the first road segment 131 at an intersection 130. In such a situation the first road segment position 1311 may be defined to be situated where the first road segment 131 enters the intersection 130. A second road segment position 1321 may be defined to be situated where the second road segment 131 enters the intersection 130.

In some embodiments, the system may be configured to transform the at least one segmented image into a two-dimensional top view of the traffic situation. The top view may be rotated such that the matching procedure is performed for a plurality of rotational positions. Each rotational position may yield one resulting matching parameter. In other words, such a configuration enables the matching procedure to take rotational position into account.

In some embodiments, the transform of the at least one segmented image into a two-dimensional top view is done by using a homography matrix. First, vanishing points are identified in the segmented image. For example, we may find the horizontal and vertical vanishing points from marks on the road segments or the walls of buildings in vertical directions. From the vanishing points, the homography matrix may be found using for geometrical operations. The homography matrix may also be determined by using a neural network. The homography matrix is applied to the at least one segmented image, transforming it to a two-dimensional top view. The homography matrix may be decomposed into various components using e.g., direct linear transformation or singular value decomposition. The various components will give information on the rotation if the image in various dimensions. By including various rotations in the matching process, the rotation that best fits the incident event data may be determined. In this way the field of view of the camera may also be determined.

In some embodiments, the system may be configured to determine the geographical position of one or both of the respective road segment positions 1311, 1321. The system may also be configured to determine the camera geographical position 102 based on the geographical position of the respective road segment position 1311, 1321. In some embodiments, the system may be configured to determine the orientation of the camera 100 based on geographical position of the respective road segment position 1311, 1321.

In some embodiments, the system may be configured to estimate the absolute distance between the road segment position 1311, 1321 and the camera geographical position 102 by using a reference object in the camera 100 field of view and performing image analysis of the at least one segmented image. The distance to the object from the camera optical centre may be determined in number of pixels. Combined with positional data related to the incident event data, it may then be deduced how far the camera is from the reference object and the road segment position.

In some embodiments, the system may be configured to determine, based on the sequence of images, a set of additional image event data. The set of additional image event data may contain a number of additional image event data. Each additional image event data may indicate a respective number of moving vehicles 120 crossing an additional cross-line 136 during the imaging time interval, $T_{IMG}$. The additional cross-line 136 is defined, using the sequence of images, to span transversely across the second road segment 131 and to be located at the second road segment position 1321. The system may be configured to obtain a set of additional incident event data from the database 160. The set of additional incident event data may contain a number additional incident event data. Each additional incident event data is indicating a respective number of moving vehicles 120 passing an additional vehicle detector 151 during the traffic event time interval, $T_{TE}$. The additional vehicle detector 151 is located at an additional detector geographical position 152.

Further, the system may be configured to perform the matching procedure on the set of additional image event data and the set of additional incident event data. The matching procedure may yield a resulting additional matching parameter. The additional matching parameter represents a measure of how well the set of additional image event data and the set of additional incident event data correspond to each other.

Based on the additional matching parameter, the system may be configured to determine that the events associated with the set of additional image event data are the events associated with the set of additional incident event. Based on the determination that the events associated with the set of additional image event data are the events associated with the set of additional incident event data, the system may be configured to determine that the camera geographical position 102 is associated with the additional detector geographical position 152. In such a configuration, image event data and incident event data may be obtained from multiple road segments in an intersection. The additional image event data and the additional incident event data may subsequently be used during the matching procedure.

In some embodiments, the system may be configured to identify a respective vehicle attribute associated with the moving vehicles 120. The identified vehicle attributes may be any one or several of colour of vehicle, type of vehicle such as car, truck, bus, speed of vehicle, and direction of movement of vehicle. The system may be configured to determine that moving vehicle 120 having a vehicle attribute crosses the cross-line 135. As the system obtains the set of incident event data from the database 160, it may be configured to obtain incident event data associated with vehicles having the vehicle attribute. The system may be configured to include the vehicle attributes of the image event data and the vehicle attributes of the incident event data in the matching procedure.

Figure 2A:
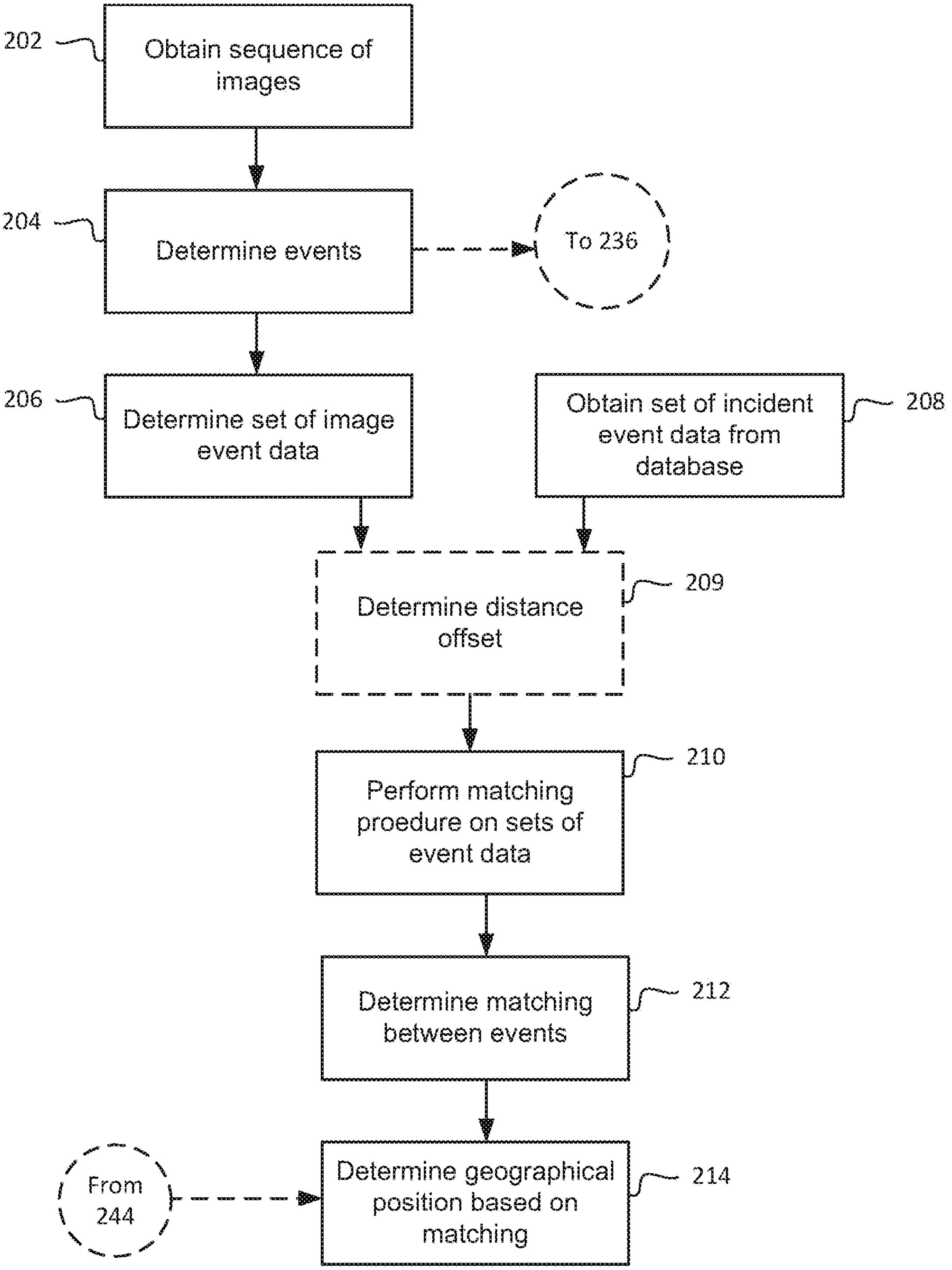
FIG. 2A is a flowchart of method steps performed in a system.
Figure 2B:
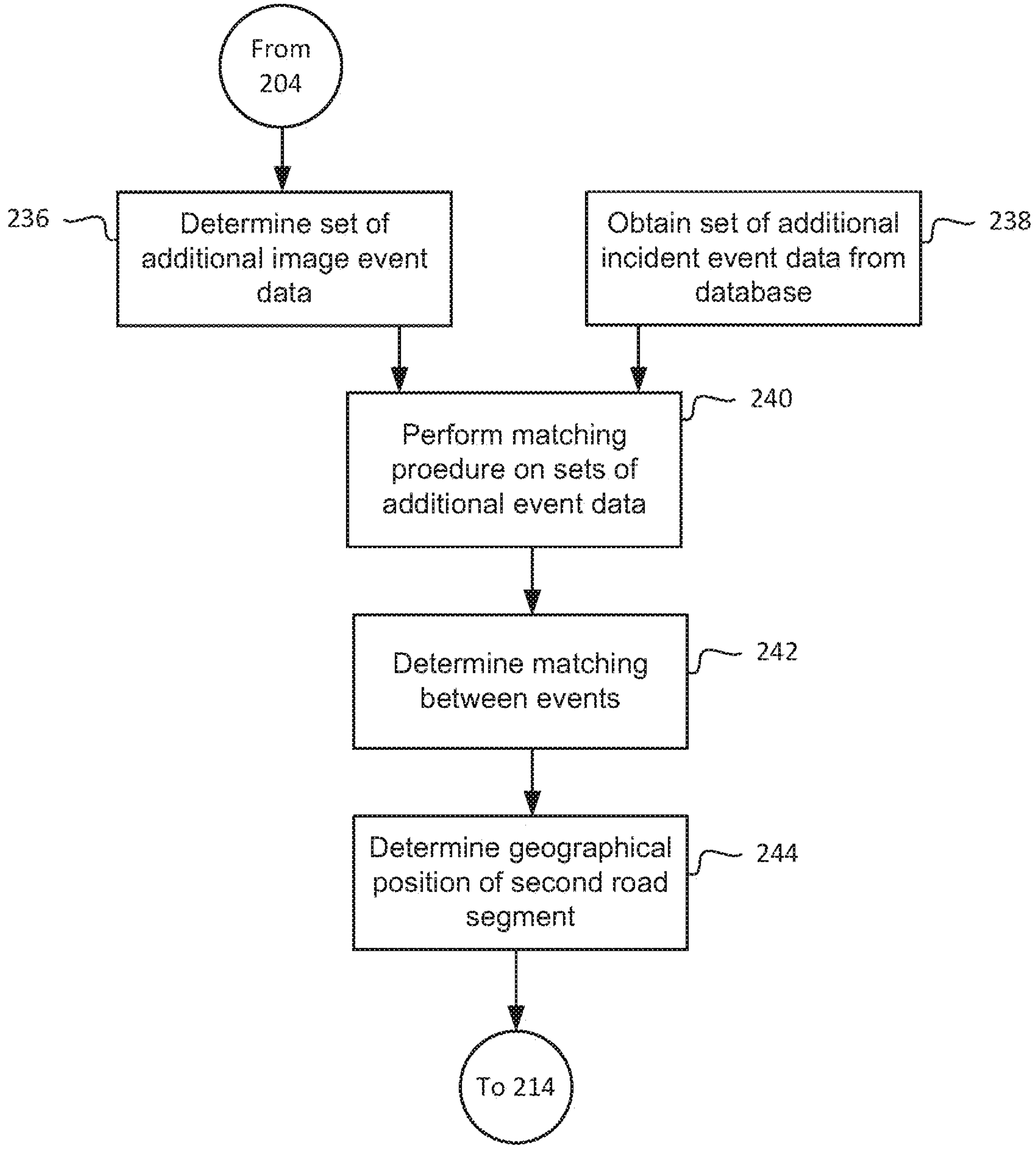
FIG. 2B is a flowchart of method steps performed in a system.

Turning to FIG. 2A and FIG. 2B, and with continued reference to FIG. 1, a method of determining the camera geographical position 102 of the camera 100 will be exemplified. The method comprises an obtaining step 202 whereby the sequence of images recorded by the camera 100 are obtained. The sequence of images depicts the traffic situation that involves the plurality of moving vehicles 120.

In a determining step 204, the plurality of events related to the moving vehicles 120 are determined based on the sequence of images.

In a further determining step 206, the set of image event data are determined based on the plurality of events. The set of image event data may contain one or more image event data. Each image event data indicates a respective number of events that occur during the respective imaging time interval, $T_{IMG}$.

In an obtaining step 208, the set of incident event data are obtained from the database 160. The set of incident event data may contain one or more incident event data. Each incident event data indicates the respective number of events that occur during the respective incident time interval, $T_{TE}$. The events of the incident event data are events detected by the traffic event detector 111 located at the detector geographical position 112. In some embodiments, each incident event data may be the respective number of vehicles 120 passing the traffic event detector 111 located at the detector geographical position 112 along the first road.

In a matching procedure step 210, the matching procedure is performed on the set of image event data and the set of incident event data. The matching procedure results in the matching parameter. The matching parameter represents a measure of how well the image event data and the incident event data correspond to each other.

In a match determining step 212, it is determined based on the matching parameter that the events associated with the set of image event data are the events associated with the set of incident event data.

In a position determining step 214, it is determined, based on the outcome of the match determining step 212, that the geographical position 102 is associated with the detector geographical position 112.

The imaging time interval TIMG and the incident time interval TTE may be selected such that they refer to, e.g., a one hour period at a specified time of day.

As illustrated in FIG. 2A, in some embodiments, the method may comprise a distance offset determining step 209 where the distance offset 139 is determined between the detector geographical position 112 and the first road segment position 1311. Based on the distance offset 139, the corresponding time offset may be estimated. The time offset may be applied on the set of image event data or the set of incident event data.

The determining step 204 may comprise performing image segmentation of the at least one image among the sequence of images recorded by the camera 100. From the at least one segmented image, the first road segment 131 may be identified. The cross-line 135 may be defined, using the sequence of images, spanning transversely across the first road segment 131, located at the first road segment position 1311 where the road segment is visible to the camera 100. It may be determined, using the sequence of images, that a moving vehicle 120 crosses the cross-line 135.

In various embodiments, the method may comprise identifying the second road segment 132 from the at least one segmented image. The second road segment 132 may intersect the first road segment 131 at an intersection 130. In such a situation the first road segment position 1311 may be defined to be situated where the first road segment 131 enters the intersection 130. The second road segment position 1321 may be defined to be situated where the second road segment 131 enters the intersection 130.

The matching step 210 may comprise transforming the at least one segmented image into the two-dimensional top view of the traffic situation. The top view may be rotated such that the matching step 210 is performed for the plurality of rotational positions. Each rotational position yields the resulting matching parameter. The matching parameter is a measure of how well the set of image event data and the set of incident event data correspond to each other.

The position determining step 214 may comprise determining the geographical position of the respective road segment positions 1311, 1321. The camera geographical position 102 may then be determined based on the geographical position of the respective road segment position 1311, 1321.

The position determining step 214 may comprise determining the orientation of the camera 100 based on geographical position of the respective road segment position 1311, 1321.

The method may comprise an additional determining step 236, in which a set of additional image event data are determined based on the sequence of images. The set of additional image event data may contain a number of additional image event data. Each additional image event data is indicating a respective number of moving vehicles 120 crossing an additional cross-line 136 during the imaging time interval, $T_{IMG}$. The additional cross-line 136 is defined, using the sequence of images, to span transversely across the second road segment 131 and to be located at the second road segment position 1321.

The method may comprise an additional obtaining step 238, in which the set of additional incident event data are obtained from the database 160. The set of additional incident event data may contain a number additional incident event data. Each additional incident event data is indicating a respective number of moving vehicles 120 passing an additional vehicle detector 151 during the traffic event time interval, $T_{TE}$. The additional vehicle detector 151 is located at an additional detector geographical position 152.

The method may comprise an additional matching step 240, in which a matching procedure is performed on the set of additional image event data and the set of additional incident event data. The matching procedure may then yield the resulting additional matching parameter. The additional matching parameter represents a measure of how well the set of additional image event data and the set of additional incident event data correspond to each other.

The method may comprise an additional match determining step 242, in which, based on the additional matching parameter, it is determined that the events associated with the set of additional image event data are the events associated with the set of additional incident event.

The method may comprise an additional position determining step 244, in which it is determined 244 that the camera geographical position 102 is associated with the additional detector geographical position 152.

The method may comprise identifying the respective vehicle attribute associated with the moving vehicles 120. The determining that a moving vehicle 120 crosses the cross-line 135 may comprise determining that the moving vehicle 120 having an identified vehicle attribute crosses the cross-line 135.

The obtaining step 208 may comprise obtaining incident event data associated with vehicles having the identified vehicle attribute.

The matching step 210 may comprise matching the vehicle attributes of the image event data and the vehicle attributes of the incident event data.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims.

The invention claimed is:

1. A method of determining a camera geographical position of a camera, the method comprising:

obtaining a sequence of images recorded by the camera, said sequence of images depicting a traffic situation involving a plurality of moving vehicles, determining, based on the sequence of images, a plurality of events related to the plurality of moving vehicles, determining, based on the plurality of determined events, a set of image event data where each image event data in the set of image event data indicates a respective number of events occurring during a respective imaging time interval ($T_{IMG}$,) obtaining, from a database, a set of incident event data where each incident event data in the set of incident event data indicates a respective number of events occurring during a respective incident time interval ($T_{TE}$,) detected by a traffic event detector located at a detector geographical position, performing a matching procedure on the set of image event data and the set of incident event data, yielding a resulting matching parameter representing a measure of how well the set of image event data and the set of incident event data correspond to each other, determining, based on the matching parameter, that the events associated with the set of image event data are the events associated with the set of incident event data, and determining, based on the determination that the events associated with the set of image event data are the events associated with the set of incident event data, that the camera geographical position is associated with the detector geographical position.

2. The method according to claim 1, wherein the determining of the plurality of events related to the moving vehicles comprises:

performing image segmentation of at least one image among the sequence of images recorded by the camera to obtain at least one segmented image, identifying a first road segment from the at least one segmented image, defining a cross-line, using the sequence of images, spanning transversely across the first road segment, located at a first road segment position where the first road segment is visible to the camera, and determining, using the sequence of images, that a moving vehicle crosses the cross-line.

3. The method according to claim 2, wherein each incident event data in the set of incident event data indicates a respective number of moving vehicles passing the traffic event detector located at the detector geographical position, wherein the traffic event detector is located along the first road segment.

4. The method according to claim 3, further comprising:

determining, a distance offset between the detector geographical position and the first road segment position, and wherein: the matching procedure comprises estimating a time offset corresponding to the distance offset and applying the time offset on the set of image event data or the set of incident event data.

5. The method according to claim 2, further comprising:

identifying a second road segment from the at least one segmented image, said second road segment intersecting said first road segment at an intersection, and defining the first road segment position to be situated where the first road segment enters the intersection, and defining a second road segment position to be situated where the second road segment enters the intersection.

6. The method according to claim 5, wherein the determination that the camera geographical position is associated with the detector geographical position comprises: determining geographical positions of the first and second road segment positions, and determining the camera geographical position based on the geographical positions of the first and second road segment positions.

7. The method according to claim 6, wherein the matching procedure comprises:

transforming the at least one segmented image into a two-dimensional top view of the traffic situation, and rotating the two-dimensional top view of the traffic situation and performing the matching procedure for a plurality of rotational positions, yielding a resulting matching parameter for each rotational position of the plurality of rotational positions, wherein the resulting matching parameter for each rotational position is a measure of how well the set of image event data and the set of incident event data correspond to each other.

8. The method according to claim 7, wherein the determining that the camera geographical position is associated with the detector geographical position comprises determining an orientation of the camera based on the geographical positions of the first and second road segment positions.

9. The method according to claim 6, further comprising: determining, based on the sequence of images, a set of additional image event data where each additional image event data in the set of additional image event data indicates a respective number of moving vehicles crossing an additional cross-line during the respective imaging time interval ($T_{IMG'}$) where the additional cross-line is defined, using the sequence of images, to span transversely across the second road segment and to be located at the second road segment position, obtaining, from the database, a set of additional incident event data where each additional incident event data in the set of additional incident event data indicates a respective number of moving vehicles passing an additional vehicle detector located at an additional detector geographical position, during the respective incident time interval ($T_{TE'}$)

performing a matching procedure on the set of additional image event data and the set of additional incident event data, yielding a resulting additional matching parameter representing a measure of how well the set of additional image event data and the set of additional incident event data correspond to each other, determining, based on the additional matching parameter, that the events associated with the set of additional image event data are the events associated with the set of additional incident event, and determining, based on the determination that the events associated with the set of additional image event data are the events associated with the set of additional incident event data, that the camera geographical position is associated with the additional detector geographical position.

10. The method according to claim 2, comprising:

identifying a respective vehicle attribute associated with the plurality of moving vehicles, and wherein:

the determining that the moving vehicle crosses the cross-line comprises determining that a vehicle having an identified vehicle attribute crosses the cross-line, the obtaining, from the database, the set of incident event data comprises obtaining incident event data associated with vehicles having the identified vehicle attribute, and wherein:

the matching procedure comprises matching vehicle attributes from the set of image event data and vehicle attributes from the set of incident event data.

11. The method according to claim 10, wherein the identified vehicle attribute is any one of:

a colour of a vehicle, a type of a vehicle, a speed of a vehicle, or a direction of movement of a vehicle.

12. A system for determining a camera geographical position of a camera comprising processing circuitry configured to:

obtain a sequence of images recorded by the camera, said sequence of images depicting a traffic situation involving a plurality of moving vehicles, determine, based on the sequence of images, a plurality of events related to the plurality of moving vehicles, determine, based on the plurality of determined events, a set of image event data where each image event data in the set of image event data indicates a respective number of events occurring during a respective imaging time interval ($T_{IMG'}$)

obtain, from a database, a set of incident event data where each incident event data in the set of incident event data indicates a respective number of events occurring during a respective incident time interval ($T_{TE'}$) detected by a traffic event detector located at a detector geographical position, perform a matching procedure on the set of image event data and the set of incident event data, yielding a resulting matching parameter representing a measure of how well the set of image event data and the set of incident event data correspond to each other, determine, based on the matching parameter, that the events associated with the set of image event data are the events associated with the set of incident event data, and determine, based on the determination that the events associated with the set of image event data are the events associated with the set of incident event data, that the camera geographical position is associated with the detector geographical position.

13. A non-transitory computer-readable storage medium comprising computer code which, when executed by a device with processing capabilities, causes the device to execute a method of determining a camera geographical position of a camera, the method comprising:

obtaining a sequence of images recorded by the camera, said sequence of images depicting a traffic situation involving a plurality of moving vehicles, determining, based on the sequence of images, a plurality of events related to the plurality of moving vehicles, determining, based on the plurality of determined events, a set of image event data where each image event data in the set of image event data indicates a respective number of events occurring during a respective imaging time interval ($T_{IMG'}$)

obtaining, from a database, a set of incident event data where each incident event data in the set of incident event data indicates a respective number of events occurring during a respective incident time interval ($T_{TE'}$) detected by a traffic event detector located at a detector geographical position, performing a matching procedure on the set of image event data and the set of incident event data, yielding a resulting matching parameter representing a measure of how well the set of image event data and the set of incident event data correspond to each other, determining, based on the matching parameter, that the events associated with the set of image event data are the events associated with the set of incident event data, and determining, based on the determination that the events associated with the set of image event data are the events associated with the set of incident event data, that the camera geographical position is associated with the detector geographical position.

* * * * *